June 19, 1934.   M. FRÄNKL   1,963,840
PROCESS FOR THE RESOLUTION OF GAS MIXTURES
Filed Oct. 14, 1931
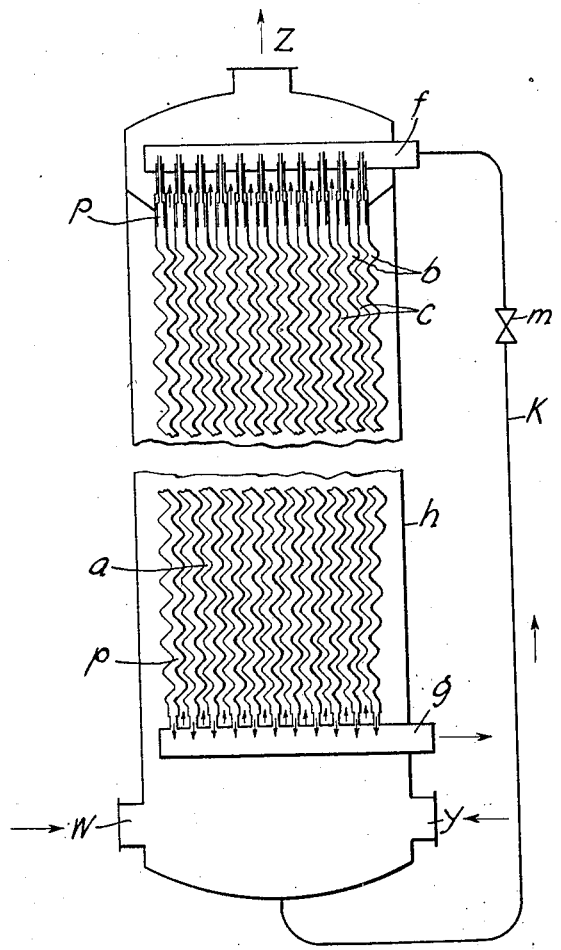
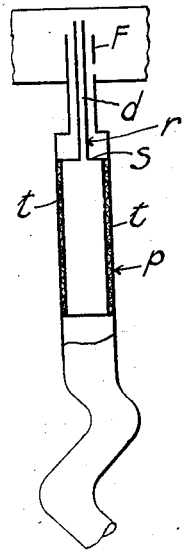
INVENTOR-
MATHIAS FRÄNKL
BY
Watson, Bristol, Johnson & Leavenworth
ATTORNEYS Patented June 19, 1934

1,963,840

UNITED STATES PATENT OFFICE 1,963,840

PROCESS FOR THE RESOLUTION OF GAS MIXTURES

Mathias Fränkl, Augsburg, Germany, assignor to American Oxythermic Corporation, New York, N. Y., a corporation of Delaware Application October 14, 1931, Serial No. 568,715
In Germany May 16, 1931

7 Claims. (Cl. 62—175.5)

The invention relates to a process and an apparatus for the resolution of gas mixtures, more particularly for the resolution of air into nitrogen and oxygen and includes correlated improvements and discoveries whereby the separation of gas mixtures may be enhanced.

If it is desired to separate the nitrogen only partially from air by fractional condensation and rectification by the Claude method, so that a mixture rich in oxygen—having an oxygen content of approximately 50 per cent—is recovered, then the vaporizer side of a condenser is filled with the produced liquid of approximately 50 per cent oxygen content, and on the condenser side the air is passed up from below through the vertical pipes of an upright condenser. On its way through the pipes the oxygen is condensed and nitrogen passes out at the top in gaseous form. The liquid produced on the upper part of the pipe walls consists of almost pure nitrogen, but on the lower part, of approximately half oxygen and half nitrogen.

The upper liquid, rich in nitrogen content, during its downward flow, becomes enriched with oxygen, which it takes up from the air passing through the pipes, and an equivalent amount of nitrogen vaporizes out of the liquid. That is, a fractional condensation and a rectification occur simultaneously. The crude liquid oxygen produced, containing approximately 50 per cent oxygen, is now led to the vaporizer side of the condenser and is there vaporized continuously in order to yield approximately 50 per cent oxygen in a gaseous state. If, however, it is desired to recover a gas with approximately a 50 per cent oxygen content, then the liquid must first be concentrated in the vaporizer to approximately 75 per cent oxygen content, because this liquid would be in equilibrium with a gas containing approximately 50 per cent oxygen.

It is, therefore, necessary to condense pure nitrogen by indirect contact with a liquid containing approximately 75 per cent oxygen. The liquid having a 75 per cent oxygen content possesses, at atmospheric pressure, a vaporizing temperature of −187.5° C., while the nitrogen liquefies only at −195.5° C., thus producing an 8° C. difference in temperature. In order to overcome this difference of 8° C., the air to be resolved must be compressed to 3 atm. absolute, in order to liquefy the nitrogen at −187.5° C.

It is an object of the invention to provide a process for the resolution of gas mixtures, particularly of air, whereby the separation may be more effectively carried out with a decrease in the compression energy required.

It is a further object of the invention to provide a process which may be utilized for the separation of gas mixtures into their components, having various degrees of purity.

Still another object of the invention is to effect the resolution of a gas mixture in a manner such that liquefaction of the gas mixture is accomplished by condensation with accompanying fractionation and rectification counter-currently on the condenser side of a condenser-vaporizer and evaporation of the liquid so produced on the vaporizer side with co-current flow in a continuous manner in a thin stream and with continuity of direct contact of liquid and vapor.

Other objects of the invention will in part be obvious and will in part appear hereinafter.

The invention accordingly comprises the several steps and the relation of one or more of such steps with respect to each of the others, all as exemplified in the following detailed disclosure, and the scope of the invention will be indicated in the claims.

For a fuller understanding of the nature and objects of the invention reference should be had to the following detailed description taken in connection with the accompanying drawing, in which:

Fig. 1 represents a condenser-vaporizer having vaporizing chambers with corrugated walls and in which the process of the invention may be efficiently carried out, and Fig. 2 shows an arrangement for bringing about a distribution over the walls of the vaporizer plates.

In the practice of the invention there is no change in the operation described above on the condenser side of a reflux condenser with fractional condensation and simultaneous rectification, but the change is made on the vaporizer side. The vaporizer is not filled with liquid, but the latter is allowed to trickle down over the sides of the tubes or passages of the vaporizer, and the vaporized oxygen is not drawn off at the top of the vaporizer, but at the bottom.

According to the invention a liquid having a 50 per cent oxygen content is vaporized on the vaporizer side at the top while oppositely on the condenser side nitrogen is condensing, whereas at the bottom a liquid having a 75 per cent oxygen content is being vaporized on the vaporizer side, while on the condenser side, a liquid containing 50 per cent oxygen is being formed by condensation. In prior practice a liquid containing 75 per cent oxygen was evaporated on the vaporizer side while nitrogen would be condensing oppositely on the condenser side. Under normal pressure conditions a difference in the temperatures at which the 75 per cent oxygen containing liquid evaporated and at which the nitrogen condensed would amount to 8° C. The liquid containing 50 per cent of oxygen vaporizes at a temperature of —191.5° C. while nitrogen liquefies at —195.5° C., and a liquid containing 75 per cent oxygen vaporizes at —187.5° C. while the liquid containing 50 per cent oxygen is obtained at a temperature of —191.5° C. These temperatures are all given relative to normal pressure conditions. Therefore, a temperature difference of only 4° C. is to be overcome by a corresponding difference in pressure between the condensing air and the vaporizing liquid. Since the pressure required depends upon the temperature difference there results a theoretical saving of energy amounting to as much as 50 per cent.

The vapors first produced have a content of 21 per cent oxygen and therefore a temperature of —191.5° C. In the middle of the vaporizer the liquid should have an oxygen content of about 60 per cent, equivalent to —189.5° C. and at the bottom of the vaporizer should attain one of 75 per cent, equivalent to —187.5° C. The vapors evolved on the vaporizer side remain in contact with the liquid and at all times are substantially in phase equilibrium. The vapors during their downward flow take up oxygen from the liquid and thus become enriched therein, and in this manner an exit vapor is obtained which has an oxygen content of 50 per cent. Furthermore, the liquid does not become enriched in oxygen to an extent greater than 75 per cent, which entails its becoming warmed to a temperature of about —187.5° C.

The vaporization of liquefied gas-mixtures is effected by the invention by a reversed, in relation to prior practice, procedure in that the vapors flow co-currently with the liquid, whereby the vapors become enriched with oxygen. In the complete process the liquefied gas-mixture, on the vaporizer side, rich in oxygen, travels down co-currently in a continuous substantially uniform trickle flow in thin streams and with continuity of direct contact with the vaporized oxygen, but both together travel counter-currently to the condensing air which is led up from below on the condenser side. The vaporization of the liquid produced on the condenser side of the condenser-vaporizer is characterized by trickling the liquid in continuous films countercurrently in a continuous uniformly downward direction and in continuous indirect heat exchange relation with the gas mixture throughout the entire vaporizing period and with continuous cocurrent flow and continuity of direct contact of vapor and liquid.

The process can also be used with advantage for the recovery of oxygen of a higher concentration than 50 per cent. In this case, the crude oxygen produced with an oxygen content of from 45 to 50 per cent, must be again subjected to condensation and re-vaporization before it can be drawn off for use. This is done in the same manner, namely, the 50 per cent oxygen gas is fractionally condensed in a second condenser, thus producing a liquid mixture with a 75 per cent oxygen content, which is then led over to the vaporizer side and is there vaporized anew, producing gaseous oxygen of 75 per cent oxygen content.

In the further treatment to produce pure oxygen, a part of the separated nitrogen (about 30 per cent) is liquefied in a third vaporizer of the usual type of construction and operation, and the vapor with 75 per cent oxygen content from the second trickle-vaporizer is led into the lower half of a rectifier of the usual form, while the liquid washing-nitrogen is discharged into the top of the latter. A part of the oxygen containing vapors from the third vaporizer is led through the rectifier in order to enrich the liquid to the desired oxygen content, while the remaining part of the oxygen vapors can be withdrawn from the vaporizer for use.

The foregoing process can also be carried out by omitting the second vaporization stage, in that the 50 per cent vapor is led directly from the first vaporizer into a rectifier of the usual type of construction. In this case, about 50 per cent of the separated nitrogen must be liquefied for use as washing nitrogen, and ⅖ of the gas must be passed as pure oxygen vapor from the vaporizer (of normal operating type) through the rectifier in order completely to enrich the liquid to a 99 per cent oxygen content.

In the accompanying drawing an arrangement, intended for carrying out the process, is represented.

It consists (Fig. 1) essentially of a condenser $a$, which also acts as rectifier and vaporizer. It is built up of individual double-walled members $b$, between which are the interspaces $c$ for the inflow and passage of the air to be condensed (lower part), and the outflow of the nitrogen separated in gaseous form (upper part). The individual members are connected above with a liquid distributing-pipe $f$ and below with a gas-collecting pipe $g$, and the entire assemblage of members is housed in a jacket $h$, on the bottom of which the liquid collects, having an oxygen content of about 50 per cent, whence it is led through line $k$ and regulating valve $m$ into the vaporizing chamber $p$ and into the individual members.

These members are provided with a device $r$ (Fig. 2), which allows the liquid to flow down on the walls only and distributes it over their full width. This device consists of a sheet-metal strip $s$, bent into U shape and of two wire gauzes $t$ which are pressed against the vaporizer walls of the individual members by the two legs of the sheet-metal strip $s$. Because of the surface tension of the very narrow grooves on both sides of the sheet-metal strip and because of the increased resistance to downflow by the metal gauze inlays, the liquid is always dammed somewhat above the sheet-metal strip, and a downflow distribution of the liquid across the full width of the vaporizer walls is thereby obtained, which is of the greatest importance for the regular course of the entire vaporizing process.

The air, which is led in at $w$ and $y$ in a cooled condition, at atmospheric pressure, on its way up through the interspaces $c$, will condense only to the extent of about one-half, thereby completely vaporizing the liquid flowing down on the other side of the walls, within the vaporizing chamber, hence only gas is present at the bottoms of the vaporizing chambers $p$, which gas is led off through collecting-pipe $g$, the cold content of the gas being used to forecool the air to be resolved, to the liquefying point. On the other side of the vaporizer walls (i. e., on the condenser side), the condensation proceeds in such a manner that during the first part of its way through the interspaces $c$, a mixture with an oxygen content of about 50 per cent is first condensed out of the air, on its further way then mixtures with 40, 30, 20, and 10 per cent respectively until finally, at the top, substantially all of the oxygen has been condensed out of the air, the non-liquefied part now consists principally of nitrogen. The liquid flows down along the walls, thereby coming constantly in intimate contact with the ascending gas, so that in addition to the fractional condensation, a rectification is simultaneously produced, whereby the liquid is finally enriched to an oxygen content of about 50 per cent.

On the vaporizer side this liquid mixture, with a 50 per cent oxygen content, is fed in above, and is completely vaporized on its way down. The vapor is led down co-currently with the vaporizing liquid, and at all times phase equilibrium is substantially maintained. In this way it is possible to carry on the complete vaporization continuously in such a manner that even the last part of the vaporizing liquid cannot contain more than 75 per cent of oxygen. Hence, at the bottom, on the condenser side, a liquid having an oxygen content of about 50 per cent is formed, while at the same point on the vaporizer side a liquid mixture with about 75 per cent oxygen content, vaporizes. At the top, however, a mixture containing only 2 to 3 per cent oxygen condenses in indirect thermal contact with a vaporizing liquid mixture of about 50 per cent of oxygen.

The separated nitrogen passes out of the condenser at z, and its content of cold may be used for cooling the air to be resolved. The vaporized oxygen is drawn out of the vaporizer at a subatmospheric pressure of about 0.6 to 0.3 atm. absolute, preferably 0.5 atm. absolute in order to produce the difference in pressure necessary for the condensation of the nitrogen. Instead of drawing the oxygen out at 0.5 atm. absolute, the air to be resolved could be compressed to 2 atm. absolute. But since the amount of air is about twice as large as the amount of oxygen produced, this would involve a greater expenditure of energy, because in this case, the separated nitrogen would pass out of the apparatus at about 2 atm. absolute. Higher pressure operation therefore comes under consideration only when the nitrogen is used for covering the cold losses of the plant by expanding it in an expansion engine or turbine.

The foregoing mode of vaporizing results in a material diminution of the pressure to which a gas mixture must be subjected in order to effect its condensation, thus making it possible to rectify air under a low pressure. It is of especial value when used in combination with cold accumulators or regenerators operating with periodical reversal of flow wherein it is possible to carry out heat exchange between a gas, as air, to be separated and its separation products with a small pressure loss. By such a combination of the periodically reversed cold accumulator as a medium for heat exchange with the herein described mode of separation or vaporization it is possible fully to utilize the advantages of the vaporization process.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the resolution of a gas mixture which comprises liquefying said mixture with accompanying fractionation and rectification, having countercurrent liquid and gas flow, and vaporizing liquid so produced by trickling in continuous films countercurrently in a continuous uniformly downward direction and in continuous indirect heat exchange relation with the gas mixture throughout the entire vaporizing period, and with continuous cocurrent flow and continuity of direct contact of vapor and liquid.

2. A process for the resolution of a gas mixture which comprises liquefying said mixture with accompanying fractionation and rectification, having countercurrent liquid and gas flow, and vaporizing liquid so produced under reduced pressure by trickling in continuous films countercurrently in a continuous uniformly downward direction and in continuous indirect heat exchange relation with the gas mixture throughout the entire vaporizing period, and with continuous cocurrent flow and continuity of direct contact of vapor and liquid.

3. A process for the resolution of a gas mixture which comprises liquefying said gas mixture with accompanying fractionation and rectification, with countercurrent flow of gas and liquid, whereby there is produced a liquid enriched in a higher boiling constituent, and obtaining a vapor enriched in the higher boiling constituent by vaporizing said liquid under reduced pressure by trickling in continuous films countercurrently in a continuous uniformly downward direction and in continuous indirect heat exchange relation with the gas mixture throughout the entire vaporizing period, and with continuous cocurrent flow and continuity of direct contact of vapor and liquid.

4. A process for the resolution of air into oxygen and nitrogen which comprises liquefying air with accompanying fractionation and rectification, having countercurrent flow of air and liquid, whereby there is produced a liquid enriched in oxygen, and vaporizing said liquid under reduced pressure by trickling in continuous films countercurrently in a continuous uniformly downward direction and in continuous indirect heat exchange relation with the air throughout the entire vaporizing period, and with continuous cocurrent flow and continuity of direct contact of vapor and liquid.

5. A process for the resolution of air into nitrogen and oxygen which comprises liquefying air under pressure with accompanying fractionation and rectification and with countercurrent flow of air and produced liquid whereby a liquid enriched in oxygen is obtained and vaporizing the liquid thus obtained under a reduced pressure by trickling in continuous films countercurrently in a continuous uniformly downward direction and in continuous indirect heat exchange relation with the air throughout the entire vaporizing period, and with continuous cocurrent flow and continuity of direct contact of vapor and liquid.

6. A process for the resolution of air into nitrogen and oxygen which comprises liquefying air with accompanying fractionation and rectification, having countercurrent flow of air and liquid, whereby a liquid enriched in oxygen is obtained, and vaporizing said liquid under a pressure of about .5 atmospheres absolute by trickling in continuous films countercurrently in a continuous uniformly downward direction and in continuous indirect heat exchange relation with the air throughout the entire vaporizing period, and with continuous cocurrent flow and continuity of direct contact of vapor and liquid.

7. A process for the resolution of air which comprises liquefying air with countercurrent flow of air and liquid produced, and vaporizing said produced liquid by trickling in continuous films countercurrently in a continuous uniformly downward direction and in continuous indirect heat exchange relation with the air throughout the entire vaporizing period, and with continuous cocurrent flow and continuity of direct contact of vapor and liquid.

MATHIAS FRÄNKL.